(12) United States Patent
Bakaleinik et al.

(10) Patent No.: US 8,819,697 B2
(45) Date of Patent: Aug. 26, 2014

(54) MANAGING ACTIONS THAT HAVE NO END EVENTS

(75) Inventors: Dmitry Bakaleinik, Petach-Tikva (IL); Carmit Pinto, Tzofim (IL)

(73) Assignee: SAP AG, Walldorf (DE)

( * ) Notice: Subject to any disclaimer, the term of this patent is extended or adjusted under 35 U.S.C. 154(b) by 140 days.

(21) Appl. No.: 13/408,349

(22) Filed: Feb. 29, 2012

(65) Prior Publication Data
US 2013/0227588 A1 Aug. 29, 2013

(51) Int. Cl.
| | | |
|---|---|---|
| G06F 3/00 | (2006.01) | |
| G06F 3/048 | (2013.01) | |
| G06F 9/54 | (2006.01) | |
| G06F 3/0485 | (2013.01) | |

(52) U.S. Cl.
CPC .............. G06F 9/542 (2013.01); G06F 3/0485 (2013.01)
USPC ............................ 719/310; 715/785; 715/786

(58) Field of Classification Search
CPC .... G06F 3/0485; G06F 3/04892; G06F 9/542
USPC ................... 719/318, 310; 715/786
See application file for complete search history.

(56) References Cited

U.S. PATENT DOCUMENTS

| | | | | |
|---|---|---|---|---|
| 6,462,752 | B1 * | 10/2002 | Ma et al. ........................ | 345/684 |
| 7,761,474 | B2 | 7/2010 | Lock et al. | |
| 8,050,952 | B2 | 11/2011 | Busch et al. | |
| 8,402,385 | B1 * | 3/2013 | Clark ............................. | 715/784 |
| 8,421,762 | B2 * | 4/2013 | Rapp et al. .................... | 345/173 |
| 2006/0224740 | A1 | 10/2006 | Sievers-Tostes et al. | |
| 2006/0282832 | A1 | 12/2006 | Nagel et al. | |
| 2007/0186182 | A1 * | 8/2007 | Schiller ........................ | 715/781 |
| 2008/0048046 | A1 * | 2/2008 | Wagner et al. .............. | 236/91 R |
| 2009/0113394 | A1 | 4/2009 | Weber et al. | |
| 2009/0164985 | A1 | 6/2009 | Balko et al. | |
| 2009/0271713 | A1 * | 10/2009 | Stull et al. ..................... | 715/753 |
| 2009/0288035 | A1 * | 11/2009 | Tunning et al. ............... | 715/784 |
| 2009/0327199 | A1 | 12/2009 | Weber et al. | |
| 2010/0017379 | A1 | 1/2010 | Naibo et al. | |
| 2010/0017380 | A1 | 1/2010 | Naibo et al. | |
| 2010/0017384 | A1 | 1/2010 | Marinescu | |
| 2010/0107116 | A1 * | 4/2010 | Rieman et al. ................ | 715/784 |
| 2011/0137820 | A1 | 6/2011 | Reisbich et al. | |
| 2011/0231317 | A1 | 9/2011 | Arsac | |
| 2012/0042278 | A1 * | 2/2012 | Vaisanen ....................... | 715/786 |

OTHER PUBLICATIONS

Marc H. Brown, Focus+Context Display of Web Pages: Implementation Alternatives, May 30, 1997.*

(Continued)

Primary Examiner — Lechi Truong
(74) Attorney, Agent, or Firm — Fish & Richardson P.C.

(57) ABSTRACT

A computer-implemented method for managing events that have no end events includes: determining that a first event has been generated that corresponds to a continuous action having no defined end event, the first event having an event type and being initiated by a user; determining whether at least a second event of the event type is initiated by the user within a specified time from initiation of the first event; and performing a functionality of the continuous action only if the second event is not initiated within the specified time, wherein the functionality is not performed until the specified time passes after a last initiated event of the event type.

14 Claims, 5 Drawing Sheets

(56) References Cited

OTHER PUBLICATIONS

'Event Computing' [online]. Wikipedia, 2011, [retrieved on Feb. 28, 2012]. Retrieved from the Internet: <URL: http://en.wikipedia.org/w/index.php?title=Event_(computing)&oldid=405976094>, 4 pages.

'Implementing Scroll Tips' [online]. SAP Library, [retrieved on Feb. 28, 2012]. Retrieved from the Internet: < http://help.sap.com/saphelp_nw73/helpdata/en/49/f85c9847573350e10000000a421937/content.htm>, 2 pages.

'Scrolling in Lists' [online]. SAP Library, [retrieved on Feb. 28, 2012]. Retrieved from the Internet: <URL: http://help.sap.com/saphelp_nw70/helpdata/en/45/2f3daf361003c3e10000000a1553f6/content.htm>, 2 pages.

Scrolling [online]. Wikipedia, 2011, [retrieved on Feb. 28, 2011]. Retrieved from the Internet: <URL: http://en.wikipedia.org/w/index.php?title=Scrolling&oldid=406461564>, 3 pages.

Web Dynpro ScrollContainer API—IWDSScrollContainer Definition [online]. SAP Library, [retrieved on Feb. 28, 2012]. Retrieved from the Internet: <URL: http://help.sap.com/saphelp_nw04/helpdata/en/3f/c0ae3dacbff972e10000000a114084/content.htm>, 2 pages.

Web Dynpro [online]. Wikipedia, 2010, [retrieved on Feb. 28, 2012]. Retrieved from the Internet: <URL: http://en.wikipedia.org/w/index.php?title=Web_Dynpro&oldid=399916290>, 2 pages.

* cited by examiner

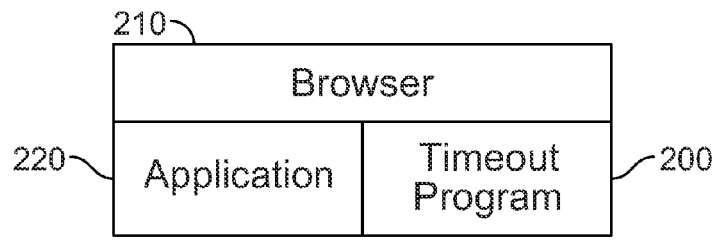
FIG. 2
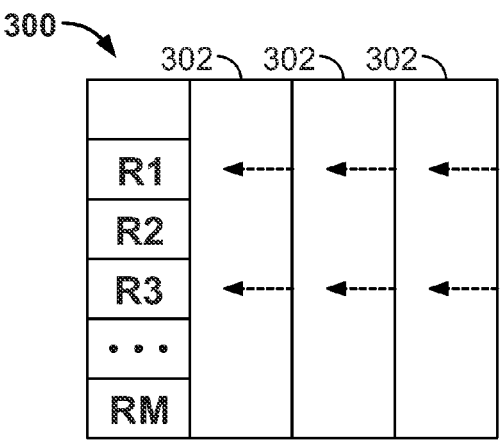
FIG. 3A
FIG. 3B
FIG. 3C

MANAGING ACTIONS THAT HAVE NO END EVENTS

TECHNICAL FIELD

This document relates to event management.

BACKGROUND

Modern browsers provide an eventing application programming interface (API) for document object model (DOM) elements or for the whole browser window. That is, various user actions, such as clicking on an application button, cause the browser to generate an event. Some of these actions have "begin" and "end" events. These events specify the state of the action, i.e., whether the action has just started or ended. For example, when a user uses the mouse to click a DOM element, two events are sent: the first is the mouse down event and the second is the mouse up event. The first event indicates that the user has started interacting with the DOM element with the mouse, while the second event indicates that the user has finished interacting with the DOM element with the mouse. The same mechanism is used when a user presses a keyboard key. In this case, the two generated events are key up and key down events.

Some actions, however, have no end events, i.e., the application receives an indication that an interaction with a DOM element has started, but it has no indication whether the interaction with the DOM element has ended. Some of these actions are continuous actions, i.e., they execute the same begin event in series but do not execute an end event. For example, the browser generates a "scroll" event each time the user scrolls a page, but the application does not know whether the user has stopped scrolling the page, since no end event is sent when the user stops scrolling. In addition, the scroll event may be generated a few or many times during the scroll, and the number of times that the scroll event is generated is not consistent across the different browsers.

SUMMARY

In a first aspect, a computer-implemented method for managing actions that have no end events includes: determining that a first event has been generated that corresponds to a continuous action having no defined end event, the first event having an event type and being initiated by a user; determining whether at least a second event of the event type is initiated by the user within a specified time from initiation of the first event; and performing a functionality of the continuous action only if the second event is not initiated within the specified time, wherein the functionality is not performed until the specified time passes after a last initiated event of the event type.

In a second aspect, a computer program product is tangibly embodied in a computer-readable storage medium and includes instructions that when executed by a processor perform a method for managing events that have no end events. The method includes: determining that a first event has been generated that corresponds to a continuous action having no defined end event, the first event having an event type and being initiated by a user; determining whether at least a second event of the event type is initiated by the user within a specified time from initiation of the first event; and performing a functionality of the continuous action only if the second event is not initiated within the specified time, wherein the functionality is not performed until the specified time passes after a last initiated event of the event type.

In a third aspect, a system includes: one or more processors; and a computer program product tangibly embodied in a computer-readable storage medium and comprising instructions that when executed by a processor perform a method for managing events that have no end events. The method includes: determining that a first event has been generated that corresponds to a continuous action having no defined end event, the first event having an event type and being initiated by a user; determining whether at least a second event of the event type is initiated by the user within a specified time from initiation of the first event; and performing a functionality of the continuous action only if the second event is not initiated within the specified time, wherein the functionality is not performed until the specified time passes after a last initiated event of the event type.

Implementations can include any or all of the following features. The first and second events are defined by at least one document object model object for the page. The method further includes: determining a time taken to render a page on which the user initiates the first event; and setting the specified time based on the determined time. The first event is a user scrolling event and the functionality is to retrieve page content. The method further includes: providing substitute content after the first event is generated; and replacing the substitute content with the retrieved page content. The method further includes: determining that a third event of another event type is generated, the third event corresponding to user activation of a button, the button not disabled after the user activation; determining whether at least a fourth event of the other event type is initiated by the user within another specified time from generation of the third event; and performing a functionality of the button only if the fourth event is not generated within the other specified time, wherein the functionality of the button is not performed until the other specified time passes after a last generated event of the other event type.

Implementations can provide any or all of the following advantages. End states can be detected for continuous actions. Prevention against multiple submits by a user can be provided. Performance can be improved because an application performs an action only after the user interaction stops.

The details of one or more implementations are set forth in the accompanying drawings and the description below. Other features and advantages will be apparent from the description and drawings, and from the claims.

DESCRIPTION OF DRAWINGS

FIG. 2 shows an example of a timeout program.

FIGS. 3A-C show an example of scrolling a page.

Like reference symbols in the various drawings indicate like elements.

DETAILED DESCRIPTION

This document describes techniques for handling actions that continuously have start events but have no end events. Using the following technique, the application identifies the last event that is generated by the DOM element for that action, and only then performs the functionality that is expected for that action. This way the functionality will be performed only once rather than the number of times which the start event has been generated by the DOM element. By implementing the following technique, the application resources such as memory and CPU are not occupied for executing repeating functionality for the same continuous action, since the application executes the desired functionality for that continuous action only once.

Some of the examples in this document refer to events that are generated by a DOM element in web applications (applications that run on web browser), but this technique can be also implemented for browser events or any other kind of events that are generated and received by any kind of application, including desktop applications, mobile applications, and server side application, as described below with reference to FIG. 5.

The technique works as follows: when a DOM element or a web browser or any other software component generates start events that has no end event, indicating that an action has been started, the events are received by the application that implements that technique and needs to execute some functionality as a response for these events. The application uses a timeout program or other software which executes software functionality after a specific time. First, if another start event occurs within the timeframe between the initial start event and when the functionality is to be executed, then execution of the functionality can be delayed. If no such intervening start event occurs, the desired functionality is executed, and so the action which generated the events is being handled only once, even though it has generated more than one start events.

Figure 1:
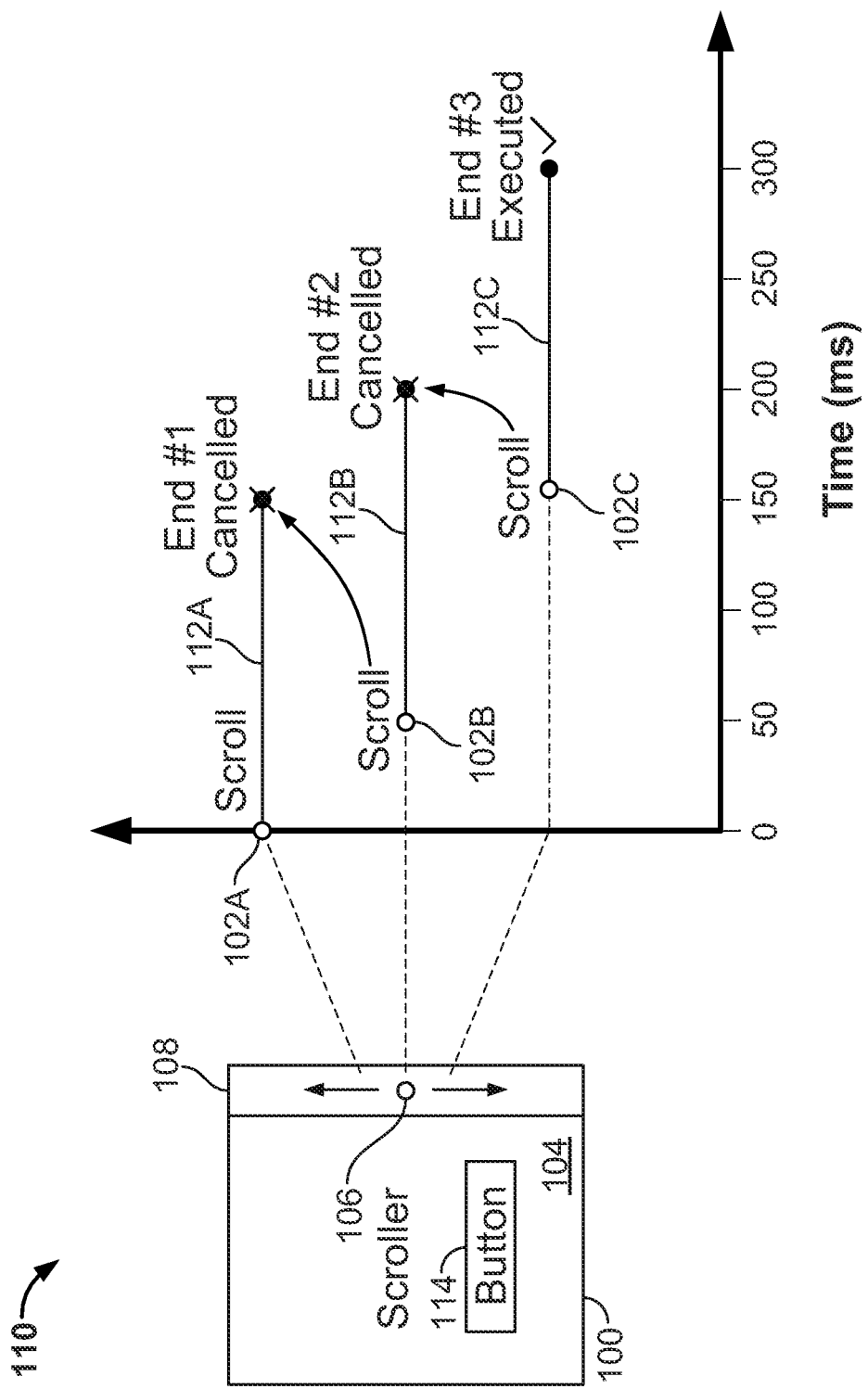
FIG. 1 schematically shows an example of a continuous action (scroll) that is performed on a browser, which then generates events.

FIG. 1 schematically shows an example of a continuous action (scroll) that is performed on a browser 100, which then generates events 102A-C. Particularly, the browser 100 is displaying a page 104 that is larger than the current size of the browser window. To save memory or for other reasons, the system in these situations does not store all data for the page locally. Rather, at least some of the currently non-displayed page content remains un-retrieved (from a server or other remote system).

A user currently drags a scroller 106 in the browser 100. The scroller 106 is a visual element that the browser provides for indicating and manipulating scrolling of a displayed page, in this example vertical scrolling along a scroll track 108. The user actuates the scroller 106 in any suitable way, for example using a mouse or other pointing device.

A diagram 110 schematically shows events generated from the scrolling, and the results thereof. The diagram 100 is here shown for purposes of illustration and is not part of the page 104 or otherwise displayed by the browser 100. A vertical axis of the diagram 110 corresponds to positions of the scroller 106 along the scroll track 108, whereas a horizontal axis indicates passage of time. The events 102A-C are marked in the diagram according to the times when they are generated.

Particularly, the event 102A is here the first one generated of the shown events. The event 102A is a type of event that does not have an associated end event. For example, the user presses a down arrow key or a page down key on a keyboard and this causes the browser 100 to generate a scrolling event 102A. That is, the event 102A is here a scrolling event for the browser window itself, but in other situations the user might be scrolling (or performing another function) using a DOM element on the page 104. Due to the size of the page, some currently non-displayed page content that should be visible after the scrolling would first have to be retrieved (e.g., from a server) before it could be displayed.

However, the user's system does not immediately perform the functionality associated with the event 102A. Rather, the system initiates a timeout period 112A from when the event 102A is generated. During the timeout period 112A, the event's associated action (e.g., retrieving more data) is not executed. The timeout period 112A can be set to any suitable value, and can be dynamically varied. In some implementations, the timeout period is on the order of 100 milliseconds (ms). Longer or short timeout periods can be used. For example, here the timeout period 112A is 150 ms.

During the timeout period 112A, the event 102B is generated, which is a scrolling event identical or equivalent to the event 102A. For example, the event 102B is generated when the user again presses the same key (or when a key autorepeat function generates another input). Similarly to the event 102A, the system does not immediately perform the functionality associated with the event 102B, but rather starts another timeout period 112B, which can be the same length as the timeout period 112A.

At the end of the timeout period 112A, the system determines that the event 102B has been generated in the meantime. The system will therefore not perform the functionality associated with the event 102A. In some implementations, the timeout period 112A can instead be terminated or otherwise discontinued upon receiving the event 102B.

During the timeout period 112B, in turn, the event 102C is generated, which is a scrolling event identical or equivalent to the events 102A and B. For example, the user again presses the same key or continues to hold down the key. At the end of the timeout period 112B, the system determines that the event 102C has been generated in the meantime, and therefore does not perform the functionality associated with the event 102B. That is, neither of the events 102A or B in this example leads to retrieval of data.

Regarding the event 102C, the system also does not perform the associated action immediately upon event generation, but rather starts another timeout period 112C, which can be the same length as the timeout period 112A and/or B. In this example, however, the user ceases to generate inputs of this type while the timeout period 112C is ongoing. For example, the user does not press the key again or releases the held-down key.

That is, at the end of the timeout period 112C no new identical or equivalent event has been generated. As a result, the system executes the associated action at the end of the timeout period 112C. For example, this action can involve retrieving more data to display on the page 104 according to the scrolling direction.

The above example shows that from a series of similar or identical events, only the last one (i.e., the event 102C) actually leads to execution of an action. This can save memory space, communication bandwidth, and/or other system resources, because the data corresponding to the intermediate events (here, events 102A and B) is not retrieved.

While vertical scrolling is used in the present example, horizontal scrolling can be handled in an analogous way. Moreover, while the present example involves events from the browser window itself (i.e., page scrolling), application events can also be handled (e.g., events from a DOM element).

The system can also manage one or more other events. In some implementations, the page 104 includes at least one button 114. Here, the button 114 is a DOM element that is not a feature of the browser 100 (unlike, say, the scroller 106 and the track 108), but rather is part of the application that provides the page 104. The button 114 generates an event upon the user clicking on, or otherwise activating, the button.

Moreover, the application that provides the page 104 does not disable the button 114 after each click/activation. This may be because the page 104 is designed so that the user should be able to use the button 114 more than once before the page is refreshed or another intervening event occurs, to name just one example.

However, multiple consecutive clicks on a button, such as the button 114, can be an indication that the user accidentally clicked more times than intended. Regardless of the reason, such duplicate inputs can put unnecessary strain on system resources. For example, the server can be hindered by too many requests, and/or available network bandwidth can diminish as a result.

The user's system can therefore ignore one or more button clicks. For example, assume that the events 102A-C discussed above were instead generated using the button 114. Then, along the lines of the above example, the first events (102A and B) are not executed, because the system detects a new event before their respective timeout periods have expired. For the last event (i.e., event 102C), however, the timeout period expires without another generated event and the functionality for the button 114 is therefore executed.

Some implementations involve interaction between components on a server side. In this case, if component A on the server interacts with component B, e.g. component A continuously activates operation C on component B, component B will "ignore" some of the C operations which were activated within the defined timeout.

FIG. 2 shows an example of a timeout program 200. Here, the timeout program 200 operates in an architecture that also involves at least one browser 210 and at least one application 220. In some implementations, the timeout program, browser and application are being executed on a single device, such as a standalone desktop computer. In other implementations, however, the application 220 is executed at a remote location for access by one or more users who have the timeout program 200 and the browser 210 being executed on their local device. For example, the application 220 can be provided in a cloud and users connect via any type of network, such as an intranet or the internet.

The timeout program 200 can detect that the browser 210 generates one or more events. This can be detected using at least one API of the browser. For example, the event can be generated by the browser itself (e.g., a window scrolling event), or the event can be generated by a DOM element on a displayed page, in which case the event is defined by the application 220.

The timeout program 200 can regulate the length of the timeout period(s) applied to one or more events. First, different events can have timeout periods of different length. For example, events from using the scroller 106 (FIG. 1) can have one timeout period (e.g., 150 ms), and events from the button 114 (FIG. 1) can have another, longer or shorter, timeout period.

Second, the timeout period for events of one or more specific event types can be dynamically varied. In some implementations, the timeout program 200 can provide timeout periods of user-specific lengths. As one example, the length may be regulated as an individual setting according to the user's preference. As another example, the timeout program can detect whether the user has a tendency to generate series of events (e.g., by repeatedly clicking a non-disabled button) and can then increase the timeout period so that only the last in such series of events is executed.

Third, the timeout program 200 can take one or more system characteristics into account when setting the timeout period. For example, if the browser 210 renders screen content relatively slowly then the timeout program 200 can increase the timeout period, so that fewer events lead to actions being performed. In some implementations, the timeout program 200 compares the detected rendering speed against one or more benchmark rendering speeds relevant to the particular browser 210 being used.

What has been said in the above examples about increasing or decreasing timeout period length could also or instead apply to switching the timeout function on or off. For example, if the execution of series of events is decreasing system performance, then the timeout program 200 can begin applying a timeout period for some or all events.

The timeout program 200 can be written in any suitable language. In some implementations, JavaScript, .Net code or Swing can be used, to name just a few examples.

FIGS. 3A-C show an example of scrolling a page 300. Here, the page includes a table with entries organized in rows 1, 2, 3, . . . , M and in columns 1, 2 and 3. The table is larger than what is currently displayed in the page 300, however, and some currently non-displayed table entries have therefore not been retrieved to the system.

FIG. 3B shows that a user horizontally scrolls the page 300. Such scrolling can generate a series of scrolling events, each of which in principle can be executed to retrieve and render data on the screen. However, rather than to perform every action of such series of events, the system can execute only the last detected event, as determined using a timeout function. That is, while the scrolling is ongoing—before the scrolling action is performed—substitute content 302 can be presented.

In this example, the substitute content 302 includes empty columns that are moved across the screen as the user scrolls the page 300. That is, while the required action of retrieving more table content is not performed until the scrolling is finished, another specific action (here, showing the substitute content 302) can be performed. In some implementations, some or all rows can also be indicated in the substitute content 302.

The substitute content 302 can be stored locally so that it requires no server roundtrip, and the use of such substitute content can improve usability. For example, the timeout program 200 (FIG. 2) can include instructions for generating empty columns (and/or rows) and rendering them on the screen.

In other implementations, other types of substitute content 302 can be presented. The substitute content can include, but is not limited to, an icon, animated content, or a GIF image, to name just a few examples.

When the last scrolling event has been detected, the system will execute that event. Here, that execution involves performing the functionality of retrieving additional table content corresponding to the table position to which the user has scrolled. The additional table content can be retrieved from a server or any other remotely located system, or otherwise from a storage (e.g., a drive or memory) regardless of location, to name a few examples.

In this example, the user has scrolled from columns 1, 2 and 3 (FIG. 3A) to columns P, Q and R, and FIG. 3C therefore shows the corresponding portion of the table where these columns are labeled CP, CQ and CR, respectively. Because no vertical scrolling was done in this example, rows 1, 2, 3, . . . , M remain visible. The table entries that are currently displayed correspond to the new set of visible columns.

While horizontal scrolling is used in the present example, vertical scrolling can be handled in an analogous way. Moreover, the present example can involve scrolling the entire page (i.e., within the browser window) or scrolling only a portion of the page (e.g., scrolling a DOM element).

Figure 4:
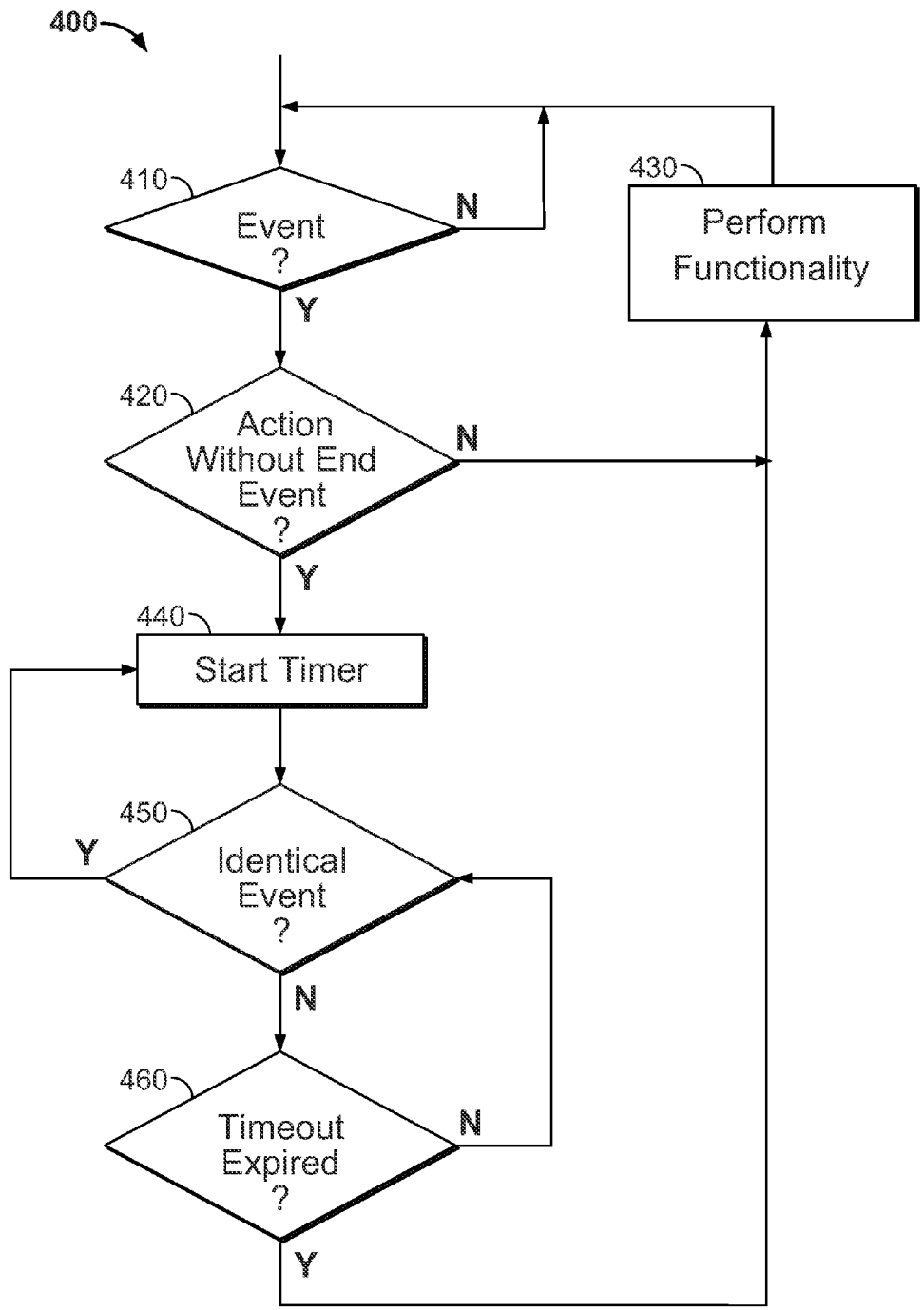
FIG. 4 shows a flow chart of an example method.

FIG. 4 shows a flow chart of an example method 400. The method 400 can be performed by a processor executing suitable instructions stored in a computer readable medium. For example, some or all of the method 400 can be implemented in the timeout program 200 (FIG. 2).

The method 400 in this example begins at 410 by determining whether an event has been detected. For example, any of the events 102A-C (FIG. 1) can be detected. If no event has been detected, the method can return to a previous stage, for example as indicated.

On the other hand, when an event has been detected, it is determined at 420 whether the event is one that does not have an end event associated with it. For example, a scrolling event does not have any end event. In some implementations, a lookup table or other record can be consulted that contains identifiers for one or more events that fit the criterion of not having any end event.

By contrast, when the user drags an object on the screen, the dragging event usually has a corresponding dropping event associated with it, so the dragging event then has an end event. If the event has an end event, then no timeout processing is performed in the current example and the event should therefore be executed. For example, one or more actions are then performed at 430, after which the method 400 can return to a previous stage, for example as indicated.

When the event has no end event, by contrast, then a timer can be started at 440. In some implementations, a countdown timer is initiated based on the time when the event was generated or detected. A timeout period of approximately 100 ms can be used, to name just one example.

At 450, it is determined whether another event has been detected. In some implementations, only an identical event is detected at this stage. That is, if the event that was detected at 410 and found not to have any end event at 420 is a scrolling event, then the detection of another scrolling event (i.e., because the user keeps scrolling) would lead to an affirmative result at 450. If so, the method can return to a previous stage, here at 440, where another timeout period is started. For example, when the event 102B (FIG. 1) was detected, the timeout period 112B (FIG. 1) was started. A currently ongoing timeout period (e.g., the timeout period 112A in FIG. 1) can then be terminated, or else it can be ignored when it expires.

If no identical even has been detected at 450, then the method determines at 460 whether the timeout period has expired. For example, determinations can be made for each of the timeout periods 112A-C (FIG. 1) at respective times. If the timeout period has not expired then the method can return to a previous stage, for example to listening for identical events at 450, as indicated.

On the other hand, if the timeout period has expired at 460, then the last detected event can be executed. For example, the functionality of the last detected event can be performed at 430. Thereafter, the method can return to a previous stage, for example as indicated.

Figure 5:
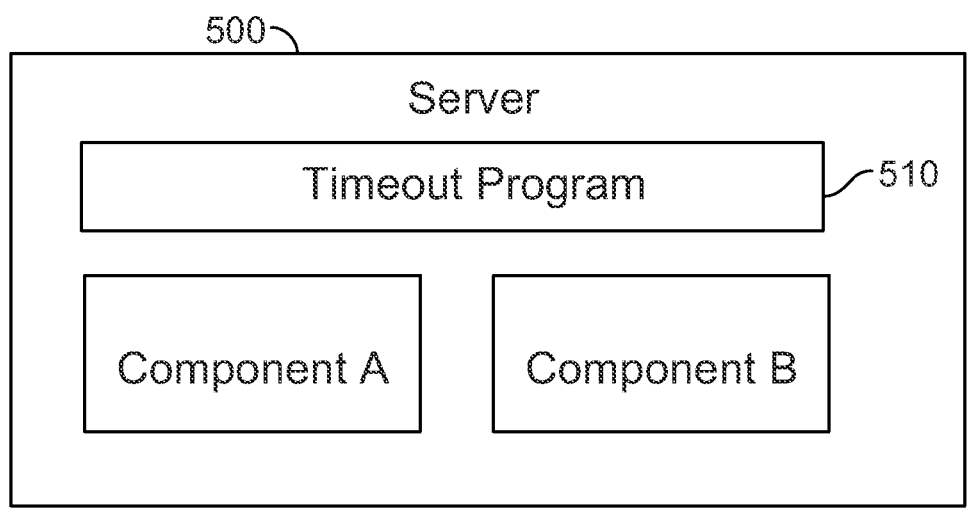
FIG. 5 shows an example of a server.

FIG. 5 shows an example of a server 500. Here, the server is schematically shown as having at least a component A and a component B, but more components can be used. Assume further that component A interacts with component B from time to time. For example, component A continuously activates an operation on component B. Such activation may be another example of an action that has no defined end event. That is, from the perspective of component B there may be no way of knowing whether component A is done, or will shortly activate the same operation again.

The server 500 here includes a timeout program 510 that monitors some or all of component A's activations. Based on such monitoring, the timeout program 510 can instruct the component B to ignore or otherwise not comply with one or more of the activations. For example, the timeout program 510 can determine that the activation corresponds to an action that has no defined end event, and determine whether component A again activates the operation on component B within a specified time. The timeout program 510 can provide that the operation is activated only if no additional activation is done within the specified time. As a result, the operation is not activated until the specified time passes after a last attempted activation.

Figure 6:
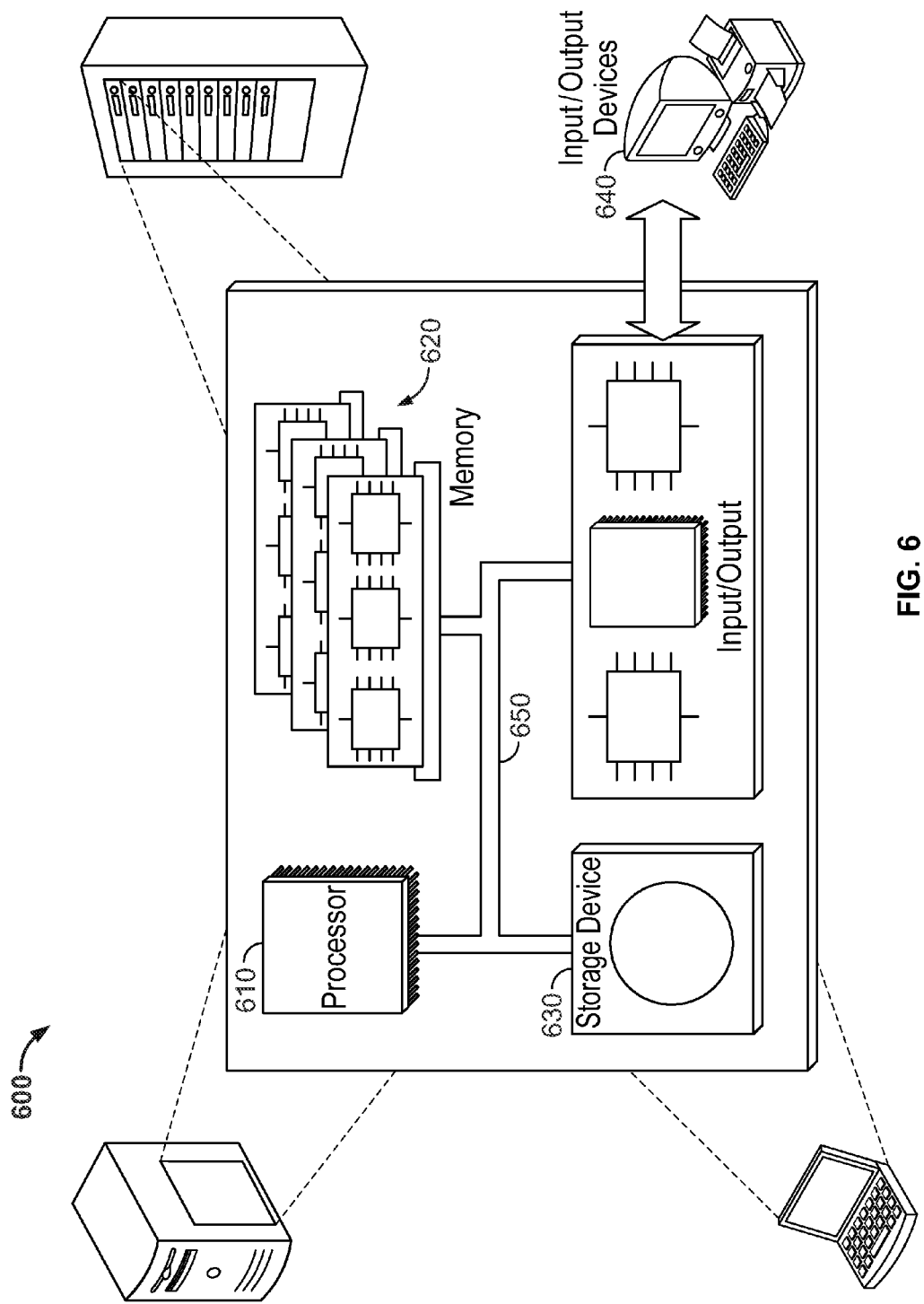
FIG. 6 is a block diagram of a computing system that can be used in connection with computer-implemented methods described in this document.

FIG. 6 is a schematic diagram of a generic computer system 600. The system 600 can be used for the operations described in association with any of the computer-implement methods described previously, according to one implementation. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. The memory 620 is a volatile memory unit in some implementations and is a non-volatile memory unit in other implementations.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of this disclosure. Accordingly, other implementations are within the scope of the following claims.

What is claimed is:

1. A computer-implemented method, the method comprising:
    determining, by a computing system, that a first user input of a first event type has been received in response to a first graphical user interface being displayed;
    determining, by the computing system, whether a second user input of the first event type has been received within a specified time from receiving the first user input;
    delaying, by the computing system, execution of an operation to load page content from a remote server, in response to a determination that the second user input of the first event type was received within the specified time from receiving the first user input;
    providing substitute content that is not received from the remote server after the first user input has been received and prior to execution of the operation to load page content;
    determining, by the computing system, whether a third user input of the first event type is received within the specified time from receiving the second user input or another user input that is of the first event type and that follows the second user input;
    executing, by the computing system, the operation to load page content as a result of having determined that the third user input was not received within the specified time from receiving the second user input or the another user input, wherein the execution of the operation to load page content is not performed until the specified time from receiving the second user input or the another user input has passed; and
    replacing the substitute content with the loaded page content.

2. The computer-implemented method of claim 1, wherein the first and second user inputs are defined by at least one document object model object for the page.

3. The computer-implemented method of claim 1, further comprising:
    determining a time taken to render a page on which the user initiates the first user input; and
    setting the specified time based on the determined time.

4. The computer-implemented method of claim 1, wherein the first event type comprises user scrolling events.

5. The computer-implemented method of claim 1, further comprising:
    determining that a third user input of a second event type has been received, the third user input corresponding to user activation of a button, the button not disabled after the user activation;
    determining whether at least a fifth user input of the second event type is initiated by the user within another specified time from receiving the fourth user input; and
    performing a functionality of the button only if the fifth user input is not initiated within the other specified time, wherein the functionality of the button is not performed until the other specified time passes after a last received user input of the second event type.

6. A computer program product tangibly embodied in a non-transitory computer-readable storage medium and comprising instructions that when executed by a processor perform a method for managing events that have no end events, the method comprising:
    determining, by a computing system, that a first user input of a first event type has been received in response to a first graphical user interface being displayed;
    determining, by the computing system, whether a second user input of the first event type has been received within a specified time from receiving the first user input;
    delaying, by the computing system, execution of an operation to load page content from a remote server, in response to a determination that the second user input of the first event type was received within the specified time from receiving the first user input;
    providing substitute content that is not received from the remote server after the first user input has been received and prior to execution of the operation to load page content;
    determining, by the computing system, whether a third user input of the first event type is received within the specified time from receiving the second user input or another user input that is of the first event type and that follows the second user input;

executing, by the computing system, the operation to load page content as a result of having determined that the third user input was not received within the specified time from receiving the second user input or the another user input, wherein the execution of the operation to load page content is not performed until the specified time from receiving the second user input or the another user input has passed; and replacing the substitute content with the loaded page content.

7. The computer program product of claim 6, wherein the first and second user inputs are defined by at least one document object model object for the page.

8. The computer program product of claim 6, wherein the first event type comprises user scrolling events.

9. The computer program product of claim 6, the method further comprising:

determining that a third user input of a second event type has been received, the third user input corresponding to user activation of a button, the button not disabled after the user activation;

determining whether at least a fifth user input of the second event type is initiated by the user within another specified time from receiving the fourth user input; and performing a functionality of the button only if the fifth user input is not initiated within the other specified time, wherein the functionality of the button is not performed until the other specified time passes after a last received user input of the second event type.

10. A system comprising:

one or more processors; and a computer program product tangibly embodied in a non-transitory computer-readable storage medium and comprising instructions that when executed by a processor perform a method for managing events that have no end events, the method comprising:

determining, by a computing system, that a first user input of a first event type has been received in response to a first graphical user interface being displayed;

determining, by the computing system, whether a second user input of the first event type has been received within a specified time from receiving the first user input;

delaying, by the computing system, execution of an operation to load page content from a remote server, in response to a determination that the second user input of the first event type was received within the specified time from receiving the first user input;

providing substitute content that is not received from the remote server after the first user input has been received and prior to execution of the operation to load page content;

determining, by the computing system, whether a third user input of the first event type is received within the specified time from receiving the second user input or another user input that is of the first event type and that follows the second user input;

executing, by the computing system, the operation to load page content as a result of having determined that the third user input was not received within the specified time from receiving the second user input or the another user input, wherein the execution of the operation to load page content is not performed until the specified time from receiving the second user input or the another user input has passed; and replacing the substitute content with the loaded page content.

11. The system of claim 10, wherein the first and second user inputs are defined by at least one document object model object for the page.

12. The system of claim 10, the method further comprising:

determining a time taken to render a page on which the user initiates the first user input; and setting the specified time based on the determined time.

13. The system of claim 10, wherein the first event type comprises user scrolling events.

14. The system of claim 10, the method further comprising:

determining that a third user input of a second event type has been received, the third user input corresponding to user activation of a button, the button not disabled after the user activation;

determining whether at least a fifth user input of the second event type is initiated by the user within another specified time from receiving the fourth user input; and performing a functionality of the button only if the fifth user input is not initiated within the other specified time, wherein the functionality of the button is not performed until the other specified time passes after a last received user input of the second event type.

* * * * *